(No Model.)

W. M. HAMILTON.
TWO WHEELED VEHICLE

No. 291,725. Patented Jan. 8, 1884.

WITNESSES
W. Engel
J. W. Breen

INVENTOR
W. M. Hamilton
By Thos. B. Hall
ATTORNEY

UNITED STATES PATENT OFFICE.

WILLIAM M. HAMILTON, OF EUCLID, OHIO, ASSIGNOR OF TWO-THIRDS TO FRANK B. TRACY AND FRED H. OVIATT, BOTH OF SAME PLACE.

TWO-WHEELED VEHICLE.

SPECIFICATION forming part of Letters Patent No. 291,725, dated January 8, 1884.

Application filed September 22, 1883. (No model.)

*To all whom it may concern:*

Be it known that I, WILLIAM M. HAMILTON, a citizen of the United States, residing at Euclid, county of Cuyahoga, and State of Ohio, have invented certain new and useful Improvements in Two-Wheeled Vehicles; and I do hereby declare the following to be a description of the same, and of the manner of constructing and using the invention, in such full, clear, concise, and exact terms as to enable any person skilled in the art to which it appertains to construct and use the same, reference being had to the accompanying drawings, which form a part of the specification, the principle of the invention being herein explained, and the best mode in which I have contemplated applying that principle, so as to distinguish it from other inventions.

The object of this invention is to provide improved means for preventing the horse-motion of the shafts from being imparted to the vehicle-body.

Figure 1:
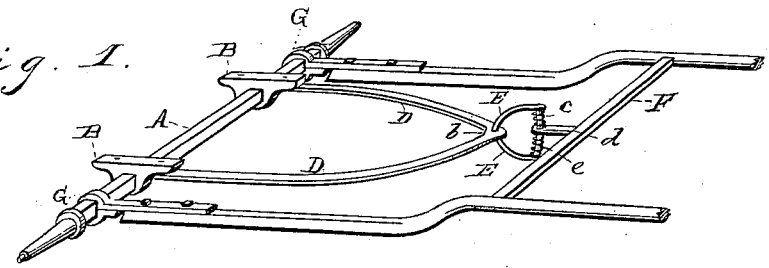
Figure 2:
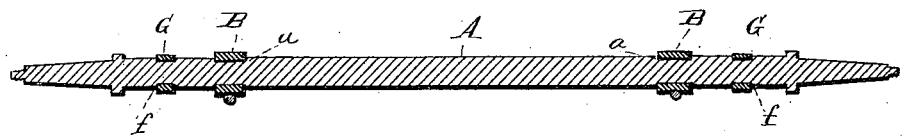
Figure 3:
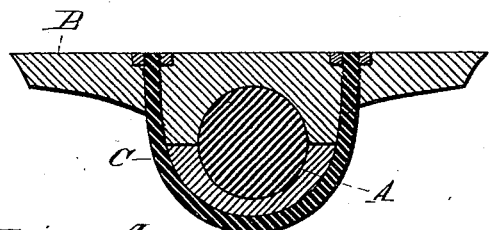
Figure 4:
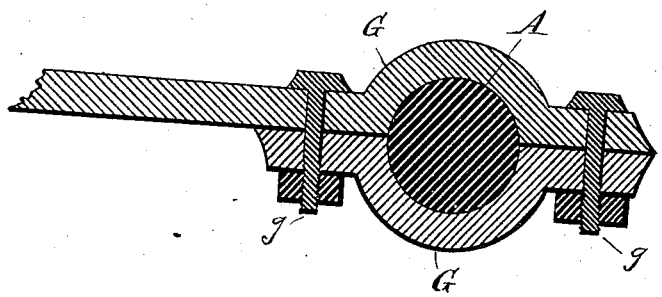

In the drawings, Figure 1 is a front perspective of the invention. Fig. 2 is a detail view in vertical longitudinal section through the axle. Fig. 3 is a detail view in cross-section of the axle, passing through one of the boxes. Fig. 4 is a similar view passing through one of the shaft-irons.

The axle A is provided with two annular grooves, $a$, in which the boxes B are respectively fitted. Clips C loosely secure the two parts of each box in position, permitting the axle to turn without carrying the box with it in such movement.

Secured rigidly to the side of each box is a rod, D, which extends obliquely forward. These two horizontally-curved rods join together at a point, $b$. From this point two vertically-curved arms, E, extend forwardly, one upwardly and one downwardly. A bolt, $c$, connects the free arms, and a single arm, $d$, extending rearwardly from the central portion of the cross-bar F, which connects the shafts together, works freely on said bolt. Two spiral springs, $e$, are fitted on the bolt, respectively above and below arm $d$. These springs serve as cushions to break the force of the horse-motion of the shafts. The boxes are thus maintained in upright position on the axle, and the vehicle-body is free from the objectionable motion of the shafts.

The shaft-irons G are respectively fitted in annular grooves $f$ of the axle, each shaft-iron having its two parts secured together by clips $g$ loosely in position, so that the shaft-iron may have oscillating movement in a vertical plane independent of the axle.

The walls of the annular grooves prevent lateral movement of the shaft-irons and the boxes, maintaining them in position, and at the same time rendering them and the axle independent as to oscillating movement.

It will be understood that the boxes are adapted for use either as direct bearings for a vehicle-body or as bearings for any suitable springs upon which the vehicle-body may be mounted.

I claim—

1. In a two-wheeled vehicle, the combination, with a box, B, mounted loosely on the axle, and adapted to support the vehicle-body, of a rod rigidly secured thereto, and a spring device connecting the rod to the shafts, said spring device operating vertically, substantially as set forth.

2. In a two-wheeled vehicle, the combination, with the boxes loosely mounted on the axle, of the two rods respectively extending forward therefrom, and a spring device adapted to operate in a vertical plane connecting the forward extremities of said rods indirectly to the shafts, substantially as set forth.

3. In a two-wheeled vehicle, the combination, with the boxes loosely mounted on the axle, and the two rods having their rear extremities respectively secured to said boxes, and their forward extremities united in a joint, of a spring device adapted to operate in a vertical plane and connecting said joint to the cross-bar of the shafts, substantially as set forth.

4. In a two-wheeled vehicle, the combination, with boxes B, rods D, and arms E, of a bolt, $c$, springs $e$, and arm $d$, substantially as set forth.

In testimony that I claim the foregoing to be my invention I have hereunto set my hand this 19th day of September, A. D. 1883.

WILLIAM M. HAMILTON.

Witnesses:
    THOS. B. HALL,
    JOS. W. BREEN.